United States Patent [19]
Hale et al.

[11] 3,951,288
[45] Apr. 20, 1976

[54] LARGE ROUND BALE HANDLING APPARATUS

[75] Inventors: John K. Hale, Knokke, Belgium;
Willis R. Campbell, Ephrata, Pa.

[73] Assignee: Sperry Rand Corporation, New Holland, Pa.

[22] Filed: Dec. 5, 1974

[21] Appl. No.: 529,984

[52] U.S. Cl. ............................ 214/506; 198/7 BL;
198/37; 198/76; 214/83.26; 214/519
[51] Int. Cl.² ......................................... B60P 1/38
[58] Field of Search ................ 214/83.26, 505, 506,
214/508, 509, 519, 520; 198/7 R, 7 BL, 8,
37, 76

[56] References Cited
UNITED STATES PATENTS

| | | | |
|---|---|---|---|
| 2,427,324 | 9/1947 | Farr et al. ................................ | 198/8 |
| 2,709,011 | 5/1955 | Radin et al. ......................... | 198/8 X |
| 3,127,973 | 4/1964 | Scott .................................. | 198/7 BL |
| 3,297,142 | 1/1967 | Edwards ....................... | 198/7 BL X |
| 3,520,434 | 7/1970 | Destefan et al. ..................... | 214/519 |
| 3,529,738 | 9/1970 | Hunt ................................... | 214/519 |
| 3,539,067 | 11/1970 | Secrist et al. ................. | 214/83.26 X |
| 3,836,021 | 9/1974 | McWilliams .......................... | 214/41 |
| 3,870,169 | 3/1975 | Kojima .................................. | 214/41 |

*Primary Examiner*—Robert J. Spar
*Assistant Examiner*—L. J. Paperner
*Attorney, Agent, or Firm*—John R. Flanagan; Frank A. Seemar; Joseph A. Brown

[57] ABSTRACT

An apparatus for handling large round bales or the like includes a mobile frame adapted for movement across a field and a bed assembly mounted thereon. The bed assembly includes a plurality of elongated, laterally spaced rails capable of being disposed in an inclined position with respect to the frame in which forward ends of the rails are disposed adjacent the field. A first flexible endless conveyor chain is movably mounted on and along a forward portion of each rail extending from the forward end thereof rearwardly through a distance preferably approximately equal to the axial length of a round bale. The first conveyor chains are capable of delivering a bale from the field to the forward ends of the rails when the rails are disposed in the inclined position and of moving the bale along the forward portions of the rails. A second flexible endless conveyor chain is movably mounted on and along a rearward portion of each rail extending from the forward rail portion to a rear end of the rail. The second conveyor chains are capable of receiving a bale from the first conveyor chains and of moving the bale along the rearward portions of the rails. Further, there is provided means for driving the first and second conveyor chains. In the preferred embodiment of the apparatus, the first chains are continuously driven whenever the drive means is operating, while the second chains are driven only at selected times. In another embodiment of the apparatus, the first and second chains are driven independently.

9 Claims, 22 Drawing Figures

LARGE ROUND BALE HANDLING APPARATUS

CROSS REFERENCES TO RELATED APPLICATIONS

Reference is hereby made to the following co-pending U.S. applications dealing with related subject matter and assigned to the assignee of the present invention:
1. "Large Round Bale Handling Apparatus" by Willis R. Campbell et al., U.S. Ser. No. 529,982, filed Dec. 5, 1974.
2. "Large Round Bale Handling Apparatus" by Shaun A. Seymour, U.S. Ser. No. 529,983, filed Dec. 5, 1974.
3. "Large Round Bale Handling Apparatus" by Willis R. Campbell, U.S. Ser. No. 529,990, filed Dec. 5, 1974.

BACKGROUND OF THE INVENTION

1. Field of the INVENTION

The present invention relates generally to the art of handling crop material and, more particularly, is concerned with apparatus for handling crop material packages such as large round bales or the like.

2. DESCRIPTION of the PRIOR ART

For many years now, the predominate method of harvesting crop material such as hay or the like in the United States and many other countries has been to continuously pick up the previously cut and windrowed hay and form it into small wire- or twine-tied rectangular bales with an automatic baler, the bales normally ranging in weight from approximately 50 to 125 pounds.

Over the years, the automatic baler method of harvesting hay has usually necessitated the assistance of a crew of persons, in addition to the baler operator, in handling and storing the bales. In recent years, the availability of hay harvesting labor has become more scarce and labor costs have steadily risen. However, the impact of these unfavorable conditions on the popularity of the automatic baler method has been greatly minimized during the past decade by the introduction and growing commercial acceptance of the automatic bale wagon, which was originally illustrated and described in U.S. Pat. No. 2,848,127 and more recently, for example, in U.S. Pat. No. 3,502,230. In many parts of the United States, the automatic baler method has been largely integrated into a completely automatic, substantially one-man hay harvesting and handling system by the aformentioned bale wagon which is believed to have assured the continued, widespread viability and soundness of the atuomatic baler method of harvesting hay.

However, even in view of the widespread acceptance of the automatic baler method and the growing acceptance of the automatic bale wagon, other alternative methods of harvesting hay have periodically been proposed and introduced over the years.

One alternate method recently introduced utilizes a hay roll forming machine or baler which picks up loose windrowed hay or the like and forms it into a large round bale or roll normally ranging in weight from approximately 600 to 1500 pounds, in axial length from approximately 4½ to 5½ feet and in diameter from approximately 4½ to 6 feet. This large round bale method of harvesting hay has been realizing considerable commercial acceptance in various regions of the United States. The success of this method is in part due to the acceptable moisture shedding and weathering attributes of the large roll when it is left resting in the field. Such attributes eliminate the necessity for immediate removal of the rolls from the field after they have been formed and deposited there by the baler, as is ordinarily required in the utilization of the small rectangular bale method in order to protect such bales from the sudden onset of inclement weather which frequently occurs in most regions of the country during the hay harvesting season.

While such attributes eliminate the need for the farmer to devote immediate attention to handling the large bales and thereby allow removal, if desired, at a later time during slack periods, efficient handling methods must be devised in order to make the large round bale or roll method feasible as a one-man hay harvesting and handling system for the large farmer. Since the size of such bales do not lend themselves to being handled by the manual labor of several persons, let alone one man, some mechanical means for handling them must be provided.

Single large round bale handling units currently available, such as three-point hitch, tractor mounted rear end loaders and tractor mounted front end loaders, are believed to be adequate for a farmer that has just a few bales to move. However, such units are uneconomical and inefficient for farming operations where large numbers of these bales must be removed from the field, transported to distant feedlots or storage areas and further handled at such locations in carrying out livestock feeding operations.

SUMMARY OF THE INVENTION

The present invention relates to an apparatus which provides an efficient and economical means for handling a plurality of crop material packages, such as large round bales or the like, and thereby integrates the large roll baler method of hay harvesting into a completely automatic, substantially one-man harvesting and handling system.

The apparatus of the present invention includes mobile frame and a bed assembly mounted thereon. The bed assembly is capable of being disposed in an inclined position in which one of its opposite ends is disposed adjacent the field.

The apparatus further includes first means movably mounted on the bed assembly along a first portion thereof which extends to and includes the one end thereof. The first movable means may be driven for delivering a bale or the like from the field to the one end of the bed assembly when the bed assembly is disposed in its inclined position and for moving the bale or the like along the first portion thereof. Also, there is provided second means movably mounted on the bed assembly along a second portion thereof which extends from the first portion thereof to the other of the opposite ends thereof. The second movable means may be driven for receiving the bale or the like from the first movable means and for moving the bale or the like along the second portion of the bed assembly.

Still further, the apparatus includes means for driving the first movable means and the second movable means.

In the preferred embodiment of the apparatus, the driving means includes power transmitting means for moving the first movable means independently of the second movable means. The power transmitting means is capable of being rendered operative and inoperative. It is operably coupled to the first movable means for continuously driving the first movable means whenever it is rendered operative. The driving means further includes means for selectively operably coupling the power transmitting means to the second movable means for driving the second movable means concurrently with the first movable means. The means for selectively operably coupling the power transmitting means to the second movable means includes first means actuated by the bale or the like, being moved along the first bed assembly portion by the first movable means, upon arrival of the bale or the like at the end of the first movable means which is opposite from the one bed assembly end and adjacent to a receiving end of the second movable means. Further included is second means which operably couples the power transmitting means to the second movable means in response to actuation of the first means by the bale or the like.

In another embodiment of the apparatus, the driving means includes first power means for driving the first movable means and second power means for driving the second movable means. The first power means and second power means are capable of being separately rendered operative and inoperative for driving the first movable means and the second movable means independently of each other.

More particularly, the bed assembly includes a plurality of elongated, laterally spaced apart support members mounted to the frame which are capable of being disposed in the inclined position in which the same one ends of the support members are disposed adjacent the field. The first movable means comprises a first endless, flexible conveyor chain mounted on each of the support members along a first portion thereof which extends to and includes the one end of each member. The second movable means comprises a second endless, flexible conveyor chain mounted on each of the support members along a second portion thereof which extends from the first portion thereof to the other end of each member.

The apparatus of the present invention is versatile in that it is capable of handling large round bales in any of several ways which serve the several end uses or purposes which most farmers contemplate for the bales. Specifically, the apparatus may be used to retrieve or pick up bales in the field and transport multiple members of them to a storage area. In those farming operations where feeding of livestock is carried out in the field or pasture instead of in feedlots, the apparatus may also be used to retrieve multiple numbers of bales which had been previously moved to a storage area, then move the bales back to a desired field location and replaced them back on the field with the same previously weathered bottom portion of the bale again resting on the field. Such controlled handling of the bales minimizes the amount of spoilage of the hay therein, which results after they have been returned to the field. Further, the apparatus is capable of retrieving multiple numbers of bales from the field or storage area and unloading them onto the bed of a truck or wagon if the farmer desires to transport the bales over greater distances than is feasible with a tractor and the retrieving apparatus itself. Also, the apparatus is capable of retrieving both newly formed bales having a solid, cylindrical form and ones which are somewhat flattened or oval in shape after they have been resting for several months, with a minimal of disturbance to the shape and appearance of either.

These and other advantages and attainments of the present invention will become apparent to those skilled in the art upon a reading of the following detailed description when taken in conjunction with the drawings in which is shown and described an illustrative embodiments of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand references are determined by standing at the rear of the apparatus and facing in the direction of forward travel. Also, in the following description, it is to be understood that such terms as "forward," "left," "upwardly," etc., are words of convenience and are not to be construed as limiting terms.

THE BALE HANDLING APPARATUS

Figure 1:
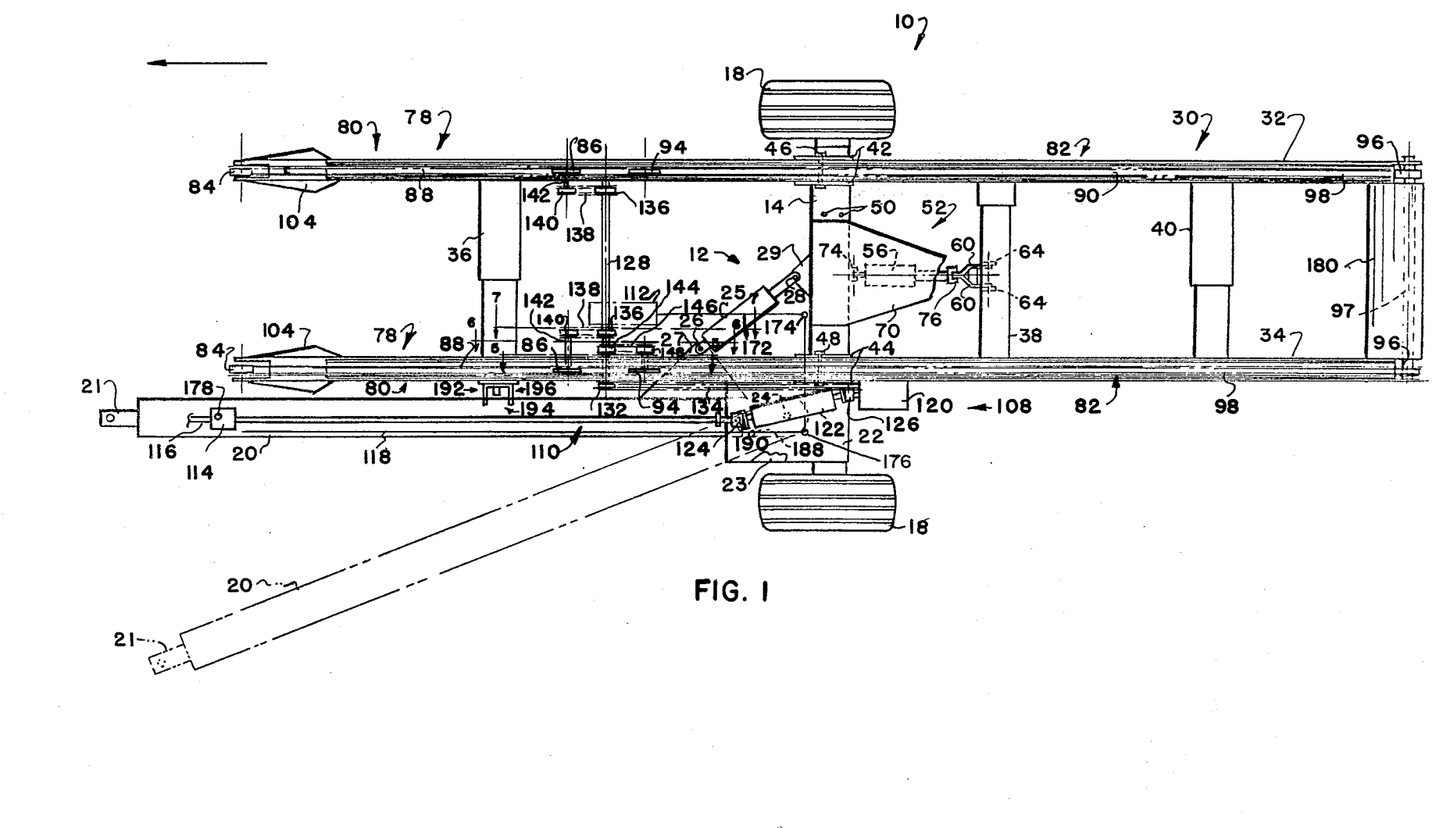
FIG. 1 is a top plan view of the preferred embodiments of a bale handling apparatus embodying the principles of the present invention.
Figure 2:
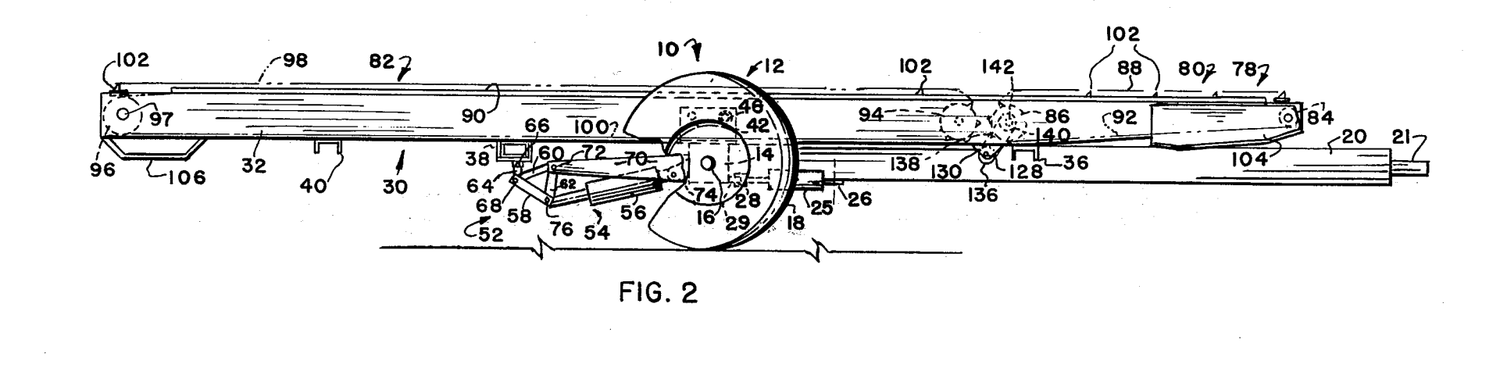
FIG. 2 is an elevational view as seen from the right side of the apparatus of FIG. 1, showing the bed assembly of the apparatus disposed in a generally horizontal position.

Referring now to the drawings, and particularly to FIGS. 1 and 2, there is shown an apparatus for handling crop material packages, such as large round bales or the like, the apparatus being indicated generally by numeral 10 and forming the preferred embodiment of the present invention (the apparatus being viewed from its right side in FIG. 2).

The apparatus 10 is provided with a mobile frame, generally indicated at 12, which includes a beam 14 having a tubular structure with axially aligned spindles 16 fixed at opposite ends thereof and a ground wheel 18 being rotatably mounted to each of the spindles 16 about a common horizontal axis defined by the spindles 16. The ground wheels 18, therefore, mount the beam 14 so as to extend in a transverse relation to the direction of forward travel of the apparatus 10, as indicated by the arrow in FIG. 1.

The mobile frame 12 of the apparatus 10 is adapted for towing behind a vehicle, such as a tractor (not shown), by an elongated draft member or tongue 20. The draft member 20, being of a tubular construction, has a hitch element 21 fixed thereon at its forward end which is adapted for securement to the drawbar (not shown) of the towing vehicle to be located at the front of the apparatus 10. At its rear end, the draft member 20 extends between a pair of spaced apart horizontal plates 22, 23 fixed to and extending forwardly from the upper and lower sides of the frame beam 16 adjacent the left end thereof. The rear end of member 20 is mounted by a pin 24 to the plates 22, 23 for pivotal movement in relation thereto and, consequently, in relation to the frame 12 about a generally upright or vertical axis defined by the pin 24. The member 20 is not movable vertically in relation to the frame 12. Therefore, the draft member 20 and the frame 12, in effect, form a substantially rigid structure with reference to a vertical plane which structure is not rotatable about the common axis of ground wheels 18 and is disposed as seen in FIG. 2 when the draft member 20 is attached to the towing vehicle.

In order to actuate pivotal movement of the draft member 20 in relation to the frame 12 about the upright axis defined by pin 24, there is provided means, preferably being a hydraulic cylinder 25, coupled between the beam 14 of frame 12 and the draft member 20. The hydraulic cylinder 25 is of the double-acting type and is supplied with fluid under pressure through hydraulic lines (not shown) from any suitable source, such as the tractor hydraulic system. The cylinder 25 is pivotally anchored at its forward cylinder end at 26 to a bracket 27 fixed to the rearward right side of the draft member 20 and pivotally coupled at its rear piston end at 28 to a bracket 29 fixed to the front side of the frame beam 14. When the hitch 21 of the draft member 20 is attached to the towing vehicle, extension and retraction of the cylinder 25 has the effect of pivoting the frame 12 away from and toward the draft member 20.

A bed assembly, generally indicated by numeral 30, is mounted to the mobile frame 12. The assembly 30 includes a pair of elongated support members or rails 32, 34 and transverse members 36, 38, 40 which interconnect with the lower sides of the rails 32, 34 and dispose the rails 32, 34 in laterally spaced apart relationship from each other. The right rail 32 extends between a pair of upright spaced apart plates 42 mounted to the upper side of the frame beam 14 adjacent to and inwardly from the right ground wheel 18 at the right end of the beam 14. The left rail 34 extends between another pair of upright spaced apart plates 44 mounted to the upper side of the frame beam 14 adjacent to and inwardly of the upper draft member mounted plate 22 at the left end of the beam 14. Right and left pivot pins 46, 48 are respectively secured to and extend between the pairs of plates 42, 44 and respectively through right and left rails 32, 34 so as to pivotally mount the rails 32, 34 generally intermediately between their respective opposite ends to respective plate pairs 42, 44 about a generally common horizontal axis defined by the pins 46, 48. The rails 32, 34 in being so mounted are disposed with their respective lower sides spaced above the upper side of the frame beam 14 so as to provide sufficient clearance therebetween for accommodating pivotal movement of each of the rails 32, 34 in a vertical plane with respect to the frame beam 14.

The rails 32, 34 are preferably intended to support a plurality of large round bales extending end-to-end therealong with the longitudinal axis of each bale extending generally parallel to the rails 32, 34. Therefore, since a lower longitudinal portion of each bale, because of its cylindrical shape, extends somewhat downwardly between the rails 32, 34, the rails 32, 34 have a predetermined height designed to allow sufficient clearance between the lower bale portion and the upper sides of the frame beam 14 and the transverse members 36, 38, 40. In effect, an elongated, unobstructed channel or passageway within which the lower bale portion may extend is defined between the rails 32, 34.

Furthermore, it is desirable that the bed assembly 30 be capable of accommodating roundbales having various diameter sizes. The bales presently formed by commercially-available roll balers generally range in diameter size from 4 1/2 to 6 feet. It has been found that bales falling within this diameter size range may be satisfactorily handled by providing the rails 32, 34 of the bed assembly 30 at one of two possible spacings. One spacing is illustrated in FIG. 1 for handling bales at the upper half of this range. The other spacing for handling bales at the lower half of this range is provided by unfastening right pivot pin 46, relocating the right rail 32 to the inner side of the inside plate of the right pair of plates 42 and then relocating the outside plate of the pair 42 on the interior side of the right rail 32. Holes 50 are provided in the beam 14 for mounting the relocated outside plate to the beam 14 with bolts (not shown). Finally, right pivot pin 46 may be refastened through the right plate pair 42 and right rail 32. It is readily apparaent that additional space settings for the rails 32, 34 could be provided, if desired.

In order to change the spacing between the rails 32, 34, the transverse members 36, 38, 40 interconnecting them must be adjustable. Therefore, as shown in FIG. 1, each of the transverse members 36, 38, 40 are formed by two separate, telescoping right and left pieces. Each right piece is fixed to the underside of the right rail 32 and each left piece is fixed to the underside of the left rail 34. Holes (not shown) are provided in each right piece which align with holes in each left piece at each of the two space settings of the rails 32, 34. Bolts (not shown) are used to fasten the respective pieces of each transverse member together.

Figure 4:
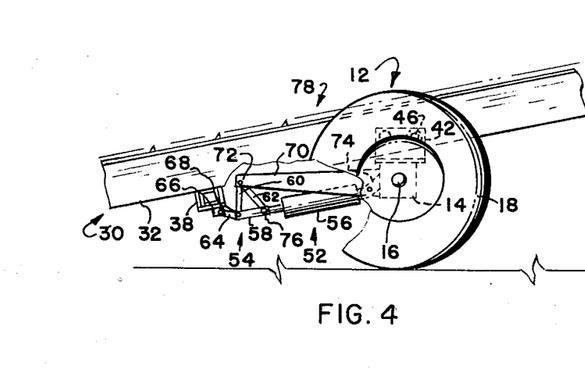
FIG. 4 is an elevational view of a fragmentary portion of the apparatus as seen in FIG. 2, but showing the bed assembly in a forwardly inclined position.

In order to actuate pivotal tilting of the bed assembly 30 relative to the frame 12 and support the bed assembly 30 at any of the positions illustrated in FIGS. 2 through 4, there is provided means, generally indicated by numeral 52, located rearwardly of the frame beam 14.

The means 52 includes a linkage assembly 54 pivotally coupled to the bed assembly 30 and a hydraulic cylinder 56 pivotally coupled between the frame 12 and the linkage assembly 54. The hydraulic cylinder 56 is of the double acting type and is supplied with fluid under pressure through hydraulic lines (not shown) from any suitable source, such as the tractor hydraulic system.

The linkage assembly 54 is designed to maximize tilting of the bed assembly 30 to its rearwardly and forwardly inclined positions upon extension and retraction of the hydraulic cylinder 56. The assembly 54 includes a pair of rearwardly-diverging lower links 58, a pair of rearwardly-diverging upper links 60 being fixed at their rear ends to the rear ends of the lower links 58, and a pair of straight front links 62 which extends between and are fixed at opposite ends respectively to the forward-converging ends of the lower links 58 and upper links 60.

The linkage assembly 54 is coupled to the bed assembly 30 by a pair of spaced apart links 64 which are pivotally fastened at their upper ends at 66 to the underside of the transverse member 38 and depend therefrom to lower ends which are pivotally fastened at 68 to the respective rear ends of the lower and upper links 58, 60 of the linkage assembly 54.

The linkage assembly 54 is further coupled to the frame 12 by a tapered bracket 70 which is fixed to the upper and rear sides of the frame beam 14, extends generally horizontally and rearwardly therefrom and pivotally mounts at 72 the forward-converging ends of the upper links 60 and the upper ends of the straight front links 62 of the linkage assembly 54.

The hydraulic cylinder 56 is pivotally anchored at its forward cylinder end to a bracket 74 fixed to the rear side of the frame beam 14 and pivotally coupled at its rear piston end at 76 to the rear ends of the lower links 58 and the lower ends of the straight front links 62 of the linkage assembly 54.

Figure 3:
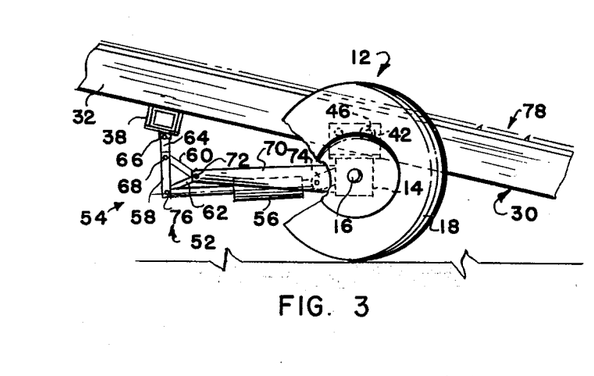
FIG. 3 is an elevational view of a fragmentary portion of the apparatus as seen in FIG. 2, but showing the bed assembly in a rearwardly inclined position.

It is readily seen in FIGS. 2 through 4 that the linkage assembly 54 swings along a generally vertical arcuate path about stationary pivot point 72 upon extension and retraction of the hydraulic cylinder 56. The angular relationship of the links 64 to the arcuate path of travel of the linkage assembly 54, when the bed assembly 30 is at either its rearwardly inclined position of FIG. 3 or its forwardly inclined position of FIG. 4, is designed to maximize the mechanical advantage of the lifting force being applied by the cylinder 56 to bed assembly 30 through the above-described linkage both as the cylinder 56 extends to or retracts from the FIG. 3 position or retracts to or extends from the FIG. 4 position. Such angular relationship of the links 64 to the arcuate path of travel of the linkage assembly 54 thereby facilitates smooth actuation of the cylinder 56 under maximum load conditions, such as when two bales are supported on the front half of the bed assembly 30 with the assembly 30 in its FIG. 3 position and it is desired to pivotally move the assembly 30 back to its horizontal position of FIG. 2 or such as when two bales are supported on the rear half of the bed assembly 30 with the assembly 30 in its FIG. 4 position and it is desired to pivotally move the assembly 30 back to its horizontal position of FIG. 2.

In order to pick up bales as the apparatus 10 is towed across the field and to move the bales along the rails 32, 34 of the bed assembly 30, there is provided bale delivering means, generally indicated by numeral 78. As seen in FIGS. 1 and 2, the means 78 includes endless flexible members in the form of front and rear conveyor chains 80, 82 which extends along each one of the rails 32, 34.

Each front conveyor chain 80 extends along a forward portion of one of the rails 32, 34 and about a first pair of front and rear sprockets 84, 86 respectively rotatably mounted at opposite ends of the forward portion of its respective one of the rails 32, 34. Such rail forward portion extends to and includes the front end of the rail and preferably is of a length generally equal to the axial length of the shortest of the large round bales intended to be handled by the apparatus 10. An upper course 88 of each front conveyor chain 80 runs along a corresponding forward portion of a track 90 defined on the upper side of its respective one of the rails 32, 34, which track 90 extends between the opposite ends of each one of the rails 32, 34. A lower course 92 (FIG. 2) of each front conveyor chain 80 travels within the hollow interior of the forward portion of its respective one of the rails 32, 34.

Each rear conveyor chain 82 extends along a rearward portion of one of the rails 32, 34 and about a second pair of front and rear sprockets 94, 96 respectively rotatably mounted at opposite ends of the rearward portion of its respective one of the rails 32, 34. The rear sprockets 96 are fixed to opposite ends of cross shaft 97. Such rail rearward portion extends from the rear end of the rail forward portion to the rear end of the rail and preferably is of a length generally four times that of the rail forward portion. An upper course 98 of each rear conveyor chain 82 runs along a corresponding rearward portion of the track 90 defined on the upper rail side, while a lower course 100 (FIG. 2) of each rear conveyor chain 82 travels within the hollow interior of the rearwardly portion of its respective one of the rails 32, 34. The right rear sprocket 96 may be adjusted laterally along the cross shaft 97 toward the left sprocket 96 upon relocation of the right rail 32 to its above-described second space setting in closer relation to the left rail 34.

Each of the chains 80, 82 is formed by an endless succession of interconnected links (not shown) and has a bale-engaging lug 102 mounted preferably to every fifth link thereof. Each lug 102 extends above the upper side of its respective one of the rails 32, 34. Also, each lug 102 on the front chains 82, as it passes about its respective front sprocket 84, extends beyond the respective one of the front ends of the rails 32, 34 so as to be exposed for engagement with the surface of a bale as the front or bale-receiving ends of the rails 32, 34 are brought into engagement with a bale as the apparatus is towed in the forward direction across the field. In such mounting arrangement of the front chains 82 on the forward portions of the rails 32, 34, the bed assembly 30 is provided with what may be termed as a "live" end; that is, the portion of the apparatus 10 which first makes contact with the bale is the ones of the lugs 102 which are passing around the front ends of the rails 32, 34 from the lower chain courses 92 to the upper chain courses 88 as the front conveyor chains 82 are moved along a counterclockwise path when viewed as in FIG. 2.

The live front ends of the rails 32, 34 and the aggressive nature of the front conveyor chains 82, due to the provision of the lugs 102 thereon, allow the bed assembly 30 to "walk" under the round bale resting on the field as the apparatus is towed across the field.

A skid shoe 104 is mounted on each front end of the rails 32, 34 so as to support the front rail end above the field and thereby prevent the live front end from digging into the field due to the weight of the bale as the front end of the apparatus 10 is brought into engagement with the bale. A forwardly opening central slot (not shown) is formed in the forwardmost portion of each shoe 104 for allowing passage of the respective one moving front conveyor chain 92 and its lugs 102. Also, another skid shoe 106 is mounted on each rear end of the rails 32, 34 for supporting the rear rail end on the field when the bed assembly 30 is tilted to its forwardly inclined position during unloading of bales.

In the preferred form of the apparatus 10, movement of the front and rear conveyor chains 80, 82 is caused by drive means, being generally designated by numeral 108 in FIG. 1. The drive means 108 includes power transmitting means, generally designated as 110, which transmit rotary power preferably from the tractor power takeoff (not shown) to the front and rear conveyor chains 80, 82. The power transmitting means 110 is capable of being rendered operative and inoperative by the operator of the tractor through controlling operation of the tractor power takeoff and is operably coupled to the front conveyor chains 80 and continuously drives the chains 80 whenever it is rendered operative by the operator. The drive means 108 further includes means, the location of which is generally indicated by 112 in FIG. 1, for selectively operably coupling the power transmitting means 110 to the rear conveyor chains 82 for driving the rear chains 82 concurrently with the front chains 80.

The power transmitting means 110 includes a reversing gearbox 114 mounted on the draft member 20 and having an input shaft 116 adapted for coupling to the tractor power takeoff, another input shaft 118 being rotatably mounted along the draft member 20 and operatively connected with and driven by the output side of the gearbox 114 at the forward end of the shaft 118, another gearbox 120 mounted to the exterior side of the left rail 34 adjacent to and rearwardly above the upper draft member mounting plate 22, and a telescoping drive shaft 122 located above the upper draft member mounting plate 22 which pivotally and drivingly interconnects the rear end of the input drive shaft 118 and the gearbox 120 by front and rear universal joints 124, 126, respectively, which thereby allow universal articulation of the shaft 118 and the gearbox 120 relative to each other.

The power transmitting means 110 further includes an output shaft 128 which extends in transverse relation to the rails 32, 34 and is rotatably mounted near its opposite ends in brackets 130 which depend from and are fixed respectively to the lower sides of the rails 32, 34 at the adjacent ends of the forward and rearward portions thereof. A drive sprocket 132 is secured to the left end of the output shaft 128, which left shaft end extends outwardly pass and below the left exterior side of the left rail 34. A drive chain 134 for driving the output shaft 128 extends along the left exterior side of the left rail 34 and about the sprocket 132 and another drive sprocket (not shown) contained in the gearbox 120. A pair of drive sprockets 136 are secured along the output drive shaft 128 respectively inwardly of and below the exterior sides of the rails 32, 34. Each sprocket 136 is drivingly interconnected by a chain 138 with a respective one of a pair of sprockets 140 which are each fixed on the inner end of one of a pair of short stub shafts 142. Each stub shaft 142 extends inwardly from a respective one of the interior sides of the rails 32, 34 and is fixed at its outer end to a respective one of the front chain rear mounting sprockets 86. Another drive sprocket 144 is secured along the output drive shaft 128 adjacent to and outwardly from the left drive sprocket 136 and drivingly interconnected by a chain 146 with an idler sprocket 148 rotatably mounted on another stub shaft 150. The stub shaft 150 extends inwardly from the interior side of the left rail 34 and is fixed at its outer end to the left rear chain front mounting sprocket 94. The right drive sprocket 136 may be adjusted laterally along the output drive shaft 128 toward the left drive sprocket 136 and the right bracket 130 may be adjusted laterally along the shaft 128 toward the left bracket 130 upon relocation of the right rail 32 to its above-described second space setting in closer relation to the left rail 34.

By the aforementioned arrangement, it is readily apparent that the power transmitting means 110 is operably coupled to the front conveyor chains 80 for continuously driving the front chains 80 whenever it is rendered operative, while it is normally inoperably coupled to the rear conveyor chains 82.

As mentioned hereinbefore, the power transmitting means 110 is operably coupled at selected intervals to the rear conveyor chains 82 by the provision of means 112 for driving of the rear chains 82 concurrently with the front chains 80. The means 112, as shown in detail in FIGS. 8 and 9, includes a cam member, generally designated by numeral 152, mounted along the output drive shaft 128 at a stationary location between spaced apart snap rings (not shown) secured to the shaft 128 for rotation at such location in relation to the shaft 128 between first and second angularly displaced positions, a clutch member 153 mounted on the stub shaft 150 for rotation therewith but also being slideable along the shaft 150 toward and away from the idler sprocket 148 during its rotation with shaft 150, and a yoke member 154 mounted along the output drive shaft 128 for sliding movement therealong and being rotatably coupled to the clutch member 153.

The cam member 152 includes right and left spaced apart and interconnected elements 155, 156 being mounted about the output shaft 128 between the aforementioned snap rings (not shown) and an arm 157 extending radially outwardly from the right cam element 155. The yoke member 154 has an annular element 158 at one end mounted about the output shaft 128 between the right and left cam elements 155, 156 and a U-shaped element 159 at its other end which is received within a circumferential groove or recess 160 formed in the clutch member 153. The clutch member 153 has an annular series of teeth 161 formed on its left side which faces a complementary series of teeth 162 formed on the right side of the idler sprocket 148.

Figures 5, 6, 7, 8A, 8B, 10:
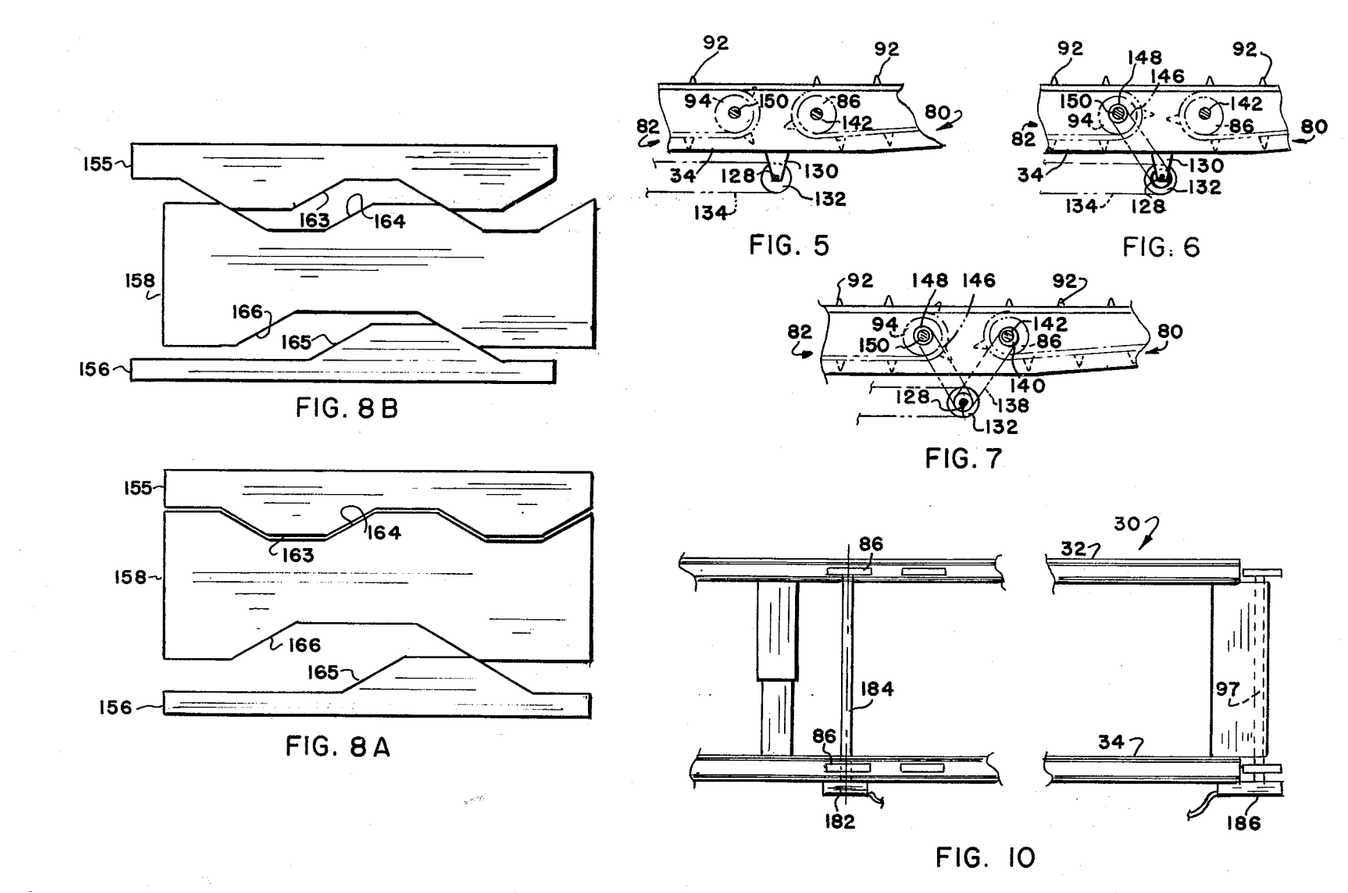
FIG. 5 is a fragmentary side elevational view taken along line 5—5 of FIG. 1, showing some of the components of the bale delivering means and of the preferred embodiment of the drive means of the apparatus.
FIG. 6 is a fragmentary side elevational view taken along line 6—6 of FIG. 1, showing the same components of the bale delivering means of the apparatus as shown in FIG. 5 and, in addition, more of the components of the preferred embodiment of the drive means of the apparatus.
FIG. 7 is a fragmentary side elevational view taken along line 7—7 of FIG. 1, showing the same components of the bale delivering means of the apparatus as shown in FIG. 5 and, in addition, still more of the components of the preferred embodiment of the drive means of the apparatus.
FIGS. 8A and 8B are enlarged schematic representations of certain of the drive means components being shown in blank layout form.
FIG. 10 is a fragmentary top plan view of the bale handling apparatus similar to FIG. 1, but showing another embodiment of the drive means for driving the bale delivering means.

Rotational movement of the cam member 152 about output shaft 128 at its stationary location therealong between its first and second angularly displaced positions, which causes lateral reciprocable sliding movement of the yoke member 154 along the output shaft 128 between elements 155, 156 of the cam member 152, may be more clearly understood by referring to FIGS. 8A and 8B. In these figures, there is illustrated blank layout representations of the cam elements 155, 156 and the annular element 158 of the yoke member 154 positioned therebetween. FIG. 8A represents the postional relationship of the annular element 158 to the respective cam elements, 155, 156 when the cam member 152 is at its first angular position, while FIG. 8B represents the positional relationship of the annular element 158 to the respective cam elements 155, 156 when the cam member 152 is at its second angular position.

Figure 9:
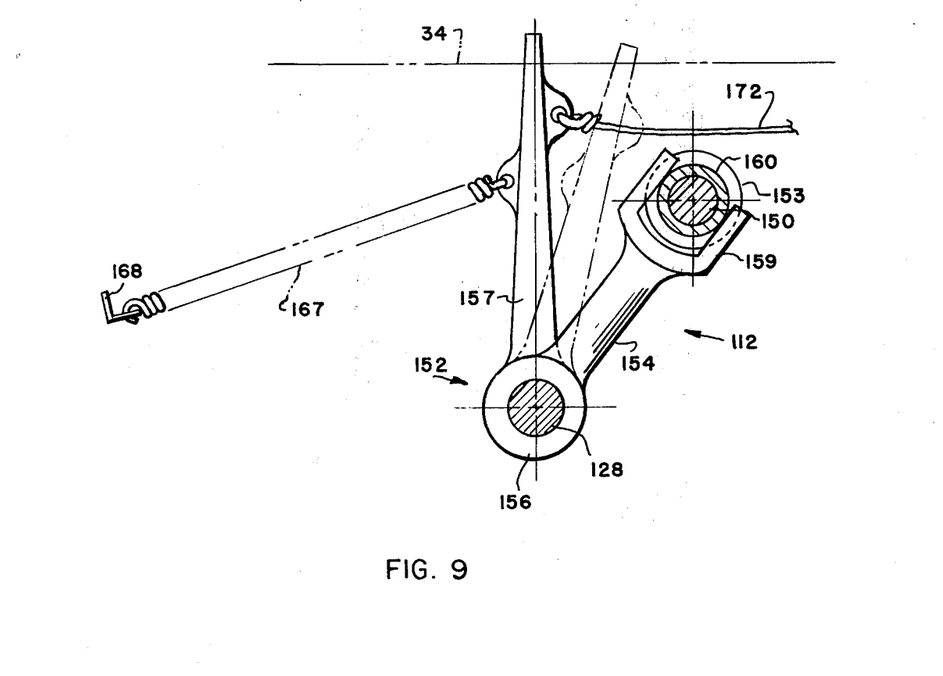
FIG. 9 is an elevational view taken along line 9—9 of FIG. 8.
Figure 11:
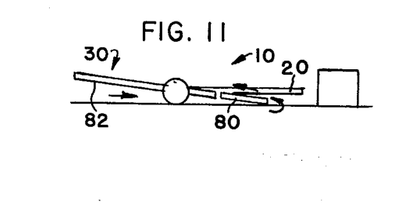
FIGS. 11 through 20 are schematic representations of various stages in the bale handling operations carried out by the apparatus.

Upon rotation of its arm 157 from the solid line location to the broken line location as seen in FIG. 9, the cam member 152 rotates in a clockwise sense about output shaft 128. When such rotation is viewed in FIGS. 8A and 8B, the cam elements 155, 156 move together with respect to annular element 158 from their first position of FIG. 8A leftward to their second position of FIG. 8B. Upon such leftward movement of the cam elements 155, 156, the right cam element 155, which at its left exterior surface 163 is meshed with the annular element 158 at its right exterior surface 164, forces the annular element 158 to slide along the output shaft 128 toward the left cam element 156. The positional relationship of the right exterior surface 165 of the left cam element 156 with the left exterior surface 166 of the annular element 158 together with the leftward movement of the left cam element 156 allow meshing to occur between the left cam element 156 and the annular element 158 so as not to obstruct the sliding movement thereof. As the annular element 158 of the yoke member 154 slides toward the left cam element 156, the U-shaped element 159 of the yoke member 154 forces the clutch member 153 to slide along stub shaft 150 toward idler sprocket 148 and the teeth 161 of the clutch member 153 to mesh with the teeth 162 of the idler sprocket 148. Upon meshing of the complementary teeth 161, 162, the stub shaft 150 will now rotate with the sprocket 148, which is being driven via chain 146 and drive sprocket 144 by output drive shaft 128, to thereby cause counterclockwise movement of the left one of the rear drive chains 82, as viewed in FIG. 2. Movement of the left rear chain 82, in turn, simultaneously causes identical movement of the right rear chain 82 via the coupling between the rear chains 82 by the rear cross shaft 97.

Upon rotation of its arm 157 from the broken line location back to the solid line location as seen in FIG. 9, the cam member 152 rotates in a counterclockwise sense about output shaft 128. When such rotation is viewed in FIGS. 8A and 8B, the cam elements 155, 156 move together with respect to annular element 158 from their second position of FIG. 8B rightward to their first position of FIG. 8A. Upon such rightward movement of the cam elements 155, 156, the left cam element 156, which at its right exterior surface 165 is meshed with the annular element 158 at its left exterior surface 166, forces the annular element 158 to slide along the output shaft 128 toward the right cam element 156. The positional relationship of the left exterior surface 163 of the right cam element 155 with the right exterior surface 164 of the annular element 158 together with the rightward movement of the right cam element 155 allow meshing to occur between the right cam element 155 and the annular element 158 so as not to obstruct the sliding movement thereof. As the annular element 158 of the yoke member 154 slides back toward the right cam element 155, the U-shaped element 159 of the yoke member 154 forces the clutch member 153 to slide along stub shaft 150 away from the idler sprocket 148 which unmeshes the respective teeth 161, 162 of the clutch member 153 and the idler sprocket 148. Upon unmeshing of the teeth 161, 162, rotation of the stub shaft 150 ceases and instantaneously so does movement of the rear chains 82.

Figure 8:
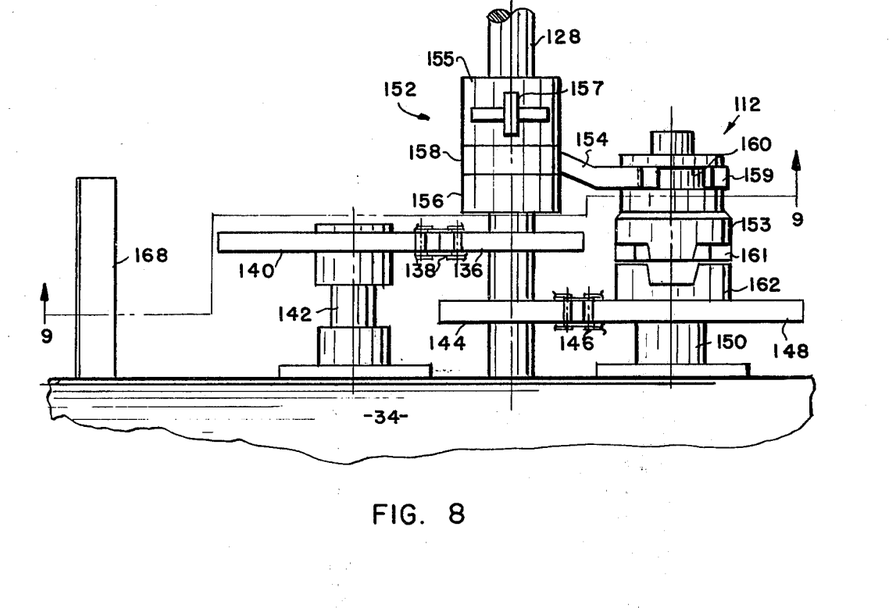
FIG. 8 is an enlarged fragmentary top plan view of some of the components of the preferred embodiment of the drive means of the apparatus of FIG. 1.

The cam member 152 is normally disposed in its first position by a spring 167 which is secured at one end to the arm 157 of the cam member 152 and at the other end to a bracket 168 fixed to the lower interior side of the left rail 34, as seen in FIG. 8. Stop surfaces (not shown) on the cam elements 155, 156 engage with complementary stop surfaces (not shown) on the annular element 158 of the yoke member 154 to prevent further counterclockwise rotation of the cam member 152 beyond its first position as seen in FIG. 9. In the first position of the cam member 152, its arm 157 extends in a generally upright relationship from the right cam element 155 with the upper end portion of the arm 157 disposed at the rear ends of the forward rail portions in the path of the leading end of a rearwardly advancing bale.

Therefore, arrival of a bale at the rear ends of the forward rail portions automatically causes the power transmitting means 110 to be operably coupled to the rear chains 82 for driving the rear chains 82 concurrently with the front chains 80 when the leading end of the rearwardly advancing bale engages and rotates the cam arm 157 clockwise from its solid line location to its broken line location of FIG. 9. Concurrent movement of the rear chains 82 with the front chains 80 continues until the trailing end of the rearwardly advancing bale passes the arm 157, at which time the spring 167 rotates the cam arm 157 back to its normally upright, solid line location of FIG. 9.

Means is also provided for actuation of movement of the rear chains 82 concurrently with the front chains 80 other than by engagement of the upright arm 157 by an advancing bale. Such means is in the form of a rope 172 attached at one end to the upright arm 157 and running therefrom to and about a pulley 174 secured to the front side of the frame beam 14, therefrom to and about a guide 176 mounted on the upper draft member mounting plate 22, and therefrom along the draft member 20 to a forward end (not shown) accessible to the tractor operator. The operator may selectively operably couple the power transmitting means 110 to the rear chains 82 by pulling forward on the rope 172 which causes rotation of the cam arm 157 and results in operation of the rear chains 82, as hereinbefore described. Release of the rope 172 discontinues movement of the rear chains 82 due to return of the arm 157 to its normal upright position by spring 167.

The reversing gearbox 114 allows the front and rear conveyor chains 80, 82 to be selectively driven in either a clockwise or counterclockwise direction. An actuating lever 178 is provided on the gearbox 114 for use by the operator in reversing the direction of operation of the gearbox 114.

A shield 180 is illustrated in FIG. 1 attached between the rails 32, 34 so as to overlie the rear cross shaft 97 and thereby prevent wrapping of crop material about the shaft 97. Also, additional shields (not shown) may be mounted along the left rail 34, draft member 20, and between the rails 32, 34 for enclosing the power transmitting means 110.

Referring now to FIG. 10, there is shown an alternative form of drive means for causing movement of the front and rear conveyor chains 80, 82. Such alternate drive means includes first power means in the form of a hydraulic motor 182 disposed on the exterior side of the left rail 34 adjacent the left rear sprocket 86 which mounts the rear end of the left front chain 80. The motor 182 is drivingly coupled to the left end of a drive shaft 184 which is rotatably mounted near its opposite ends respectively to rails 32, 34 at the rear ends of the forward portion thereof and has rear sprockets 86 respectively secured to its opposite ends. The right rear sprocket 86 may be adjusted along the shaft 184 toward the left rear sprocket 86 upon relocation of the right rail to its above-described second space setting in closer relation to the left rail 34. The hydraulic motor 182 is supplied with fluid under pressure through hydraulic lines from any suitable source, such as the hydraulic system of some tractors. The alternate drive means further includes second power means in the form of a hydraulic motor 186 disposed on the exterior side of the left rail 34 and drivingly coupled to the left end of the rear cross shaft 97. The motor 186 is supplied with fluid under pressure through hydraulic lines from any suitable source, such as the hydraulic system of some tractors. The respective hydraulic motors 182, 186 are capable of being separately rendered operative and inoperative through actuation of suitable controls (not shown) by the operator for driving the front and rear chains 80, 82 independently of each other.

Furthermore, the drive means for the front and rear conveyor chains 80, 82 may be comprised by a combination of both mechanical and hydraulic drive components, such as a mechanical drive system for the front chains 80 and hydraulic drive system for the rear chains 82, or vice versa.

CONVERSION BETWEEN TRANSPORT AND OPERATING POSITIONS

The aforementioned pivotal mounting arrangement of the draft member 20 of the apparatus 10 to the frame 12 allows conversion of the frame 12 and bed assembly 30 between a field or road transporting position generally aligned behind the towing tractor with the bed assembly 30 placed in its horizontal position by the hydraulic cylinder 56 and a field operating position generally aligned in offset relation to the right side of the tractor. The solid line location of the draft member 20 in FIG. 1 represents its position with respect to the bed assembly 30 in the road transporting position of the apparatus 10. The broken line location of the draft member 10 in FIG. 1 to the left of its solid line location represents its position with respect to the bed assembly 30 in the field operating position of the apparatus 10. Upon actuation of the hydraulic cylinder 25 so as to cause its extension or retraction, the frame 12 and bed assembly 30 are respectively pivoted relative to the draft member 20 to either the field operating position or the transporting position when the draft member 20 is attached to the towing vehicle. Deactuation of the cylinder 25 after its extension or retraction maintains the frame 12 and bed assembly 30 at either of these positions.

Vertically aligned pairs of holes 188, 190 are provided respectively in the vertically spaced apart draft member mounting plates 22, 23 which will receive a retaining pin (not shown) for assisting in the retention of the draft member 20 respectively in either one of aforementioned two locations after extension or retraction of the cylinder 25.

In FIG. 2, there is shown means, generally indicated by numeral 192, for coupling the bed assembly 30 to the draft member 20 when the bed assembly 30 is moved to its transport position and disposed at its horizontal position. The coupling means 192 includes first latch structure 194, in the form of a spring-loaded plunger, mounted on the draft member 20 and second latch structure 196, in the form of a plate having a slot (not shown) therethrough, mounted on the left rail 134 of the bed assembly 30 at the left end of the transverse member 36. The slot of structure 196 and the outer end of the plunger of structure 194 are aligned when the frame 12 and bed assembly 30 have been moved to the transport position and the bed assembly 30 is disposed in its horizontal position.

Mating of the plunger and slot is accomplished by bringing the plate of the second structure 196 and the plunger of the first structure 194 into contact with each other so as to compress the plunger. Then, slight vertical movement of the bed assembly 30 relative to the draft member 20 will being the plunger and slot in the plate into alignment, at which time the spring loaded plunger will insert into the slot in a mated relationship therewith.

Disengagement or unmating of the plunger from the slot is achieved simply by pivoting the bed assembly 30 and frame 12 away from the draft member 20.

Therefore, it is readily seen that the coupling means 192 assists the hydraulic cylinder 56 in stabilizing the bed assembly 30 at its horizontal position during transporting of the apparatus 10 when the bed assembly 30 is loaded with bales.

BALE HANDLING OPERATIONS

FIGS. 11 through 20 schematically illustrate various stages in the bale handling operations performed by the apparatus 10.

FIGS. 11 through 15 illustrate the apparatus set up in field operating position and moving across the field with its frame 12 and bed assembly 30 offset to the right rear side of the towing vehicle (not shown), which would be attached to the forward end of the draft member 20, and the bed assembly 30 rearwardly inclined such that its forward end is disposed adjacent the field. For optimum results the ground speed of the towing vehicle should match the speed of rearward movement of the upper courses of the conveyors chains 80, 82.

Large round bales are successively picked up from the field by the front conveyor chains 80 on the rails of the bed assembly 30 with the longitudinal axis of each bale extending parallel to the forward direction of apparatus movement and to the longitudinal axis of the bed assembly 30. Each bale being picked up, is carried by the upper courses of the front conveyor chains 80 along the forward portions of the rails toward the rearward portions thereof.

Figure 12:
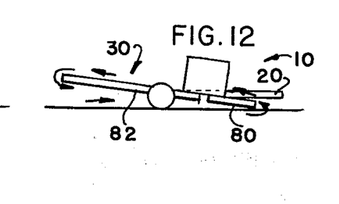
Figure 13:
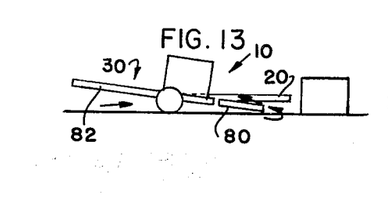
Figure 14:
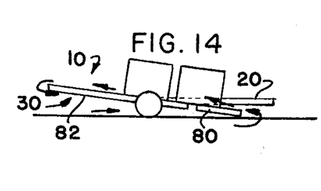
Figure 15:
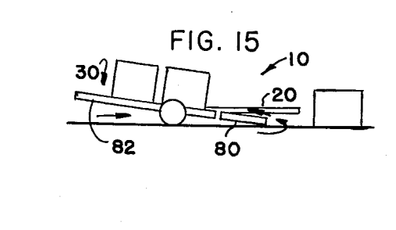

In the preferred form of the drive means for the conveyor chains 80, 82 of the apparatus 10 as described hereinabove, counterclockwise movement of the rear conveyor chains 82 commences when the leading end of the bale being rearwardly advanced by front chains 80 arrives at the rear ends of the forward rail portions. As illustrated in FIG. 12, the bale is then carried rearwardly by the upper courses of both the front and rear chains 80, 82 until the trailing end of the bale arrives at the front ends of the rearward rail portions. The rear chains 82 then automatically cease movement with the bale being stationarily positioned at the forward location on the rear rail portions as shown in FIG. 13, while the front chains 80 continue to move and pick up the next bale when the apparatus has advanced to the next bale. The rear chains 82 remain inoperative and thereby retain the first bale at such forward location on the rearward rail portions, until the leading end of the next bale arrives at the rear ends of the forward rail portions. Then, as shown in FIG. 14, the rear chains 82 are actuated to move concurrently with the front chains 80 until the second bale arrives at forward location on the rearward rail portions, as seen in FIG. 15. In such manner, the bales previously loaded on the rearward rail portions are successively moved rearwardly thereon through a distance equal to approximately one bale length after another bale has been loaded onto the forward rail portions and is moved onto the rearward rail portions. By repeating the aforementioned steps, four or five bales, depending on their respective sizes, will be loaded in single file arrangement on the bed assembly with the final bale remaining on the forward rail portions.

In the alternative form of the apparatus 10, the operator must control the actuation of the rear chains 82 so as to coordinate their movement with that of the front chains 80 in order to carry out the same loading steps.

In either the preferred or alternative form of the drive means of the apparatus 10, the front conveyor chains 80 may be moved in either a counterclockwise or clockwise sense independently of the rear conveyor chains 82. This arrangement has advantages under certain conditions, such as when one desires to retrieve bales which are frozen to the field. Under such conditions, during loading of a bale the front conveyor chains 80 may move at a speed substantially greater than the forward ground speed of the towing vehicle and the apparatus 10 due to loss of traction by the towing vehicle or it may be necessary to change the direction of movement of the front chains 80 several times in order to loosen the bale from the frozen field. With the above-described drive arrangement, loading of the bale may be carried out without disturbing the desired position of a bale or bales already loaded on the rearward rail portions of the bed assembly, since movement of the rear conveyor chains 82 will not commence until the bale has been fully loaded onto the forward rail portions of the bed assembly.

Figure 16:
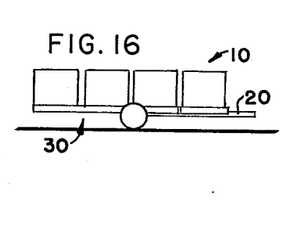
Figure 17:
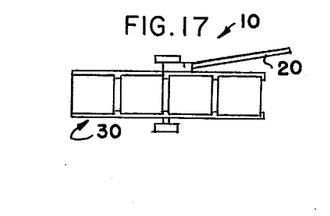

FIGS. 16 and 17 illustrate the apparatus in a fully loaded condition and after the bed assembly 30 has been returned to its horizontal position in preparation for transporting the bales from the field to a storage area. The draft member 20 is pivoted toward the bed assembly 30 to its solid line location of FIG. 1 to set up the apparatus in road transporting position.

Figure 18:
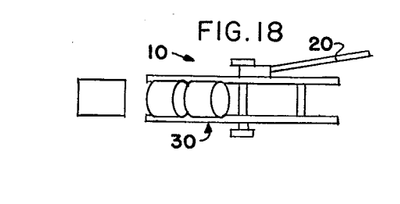
Figure 19:
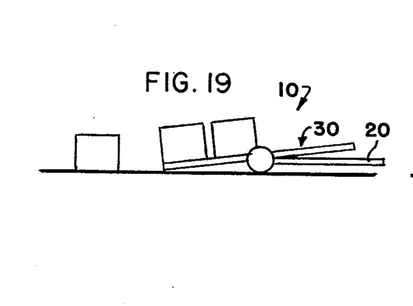

FIGS. 18 and 19 illustrate the apparatus 10 during unloading of bales at either a storage area or back onto the field. The bed assembly 30 has been tilted to its forwardly inclined position such that its rear end is disposed adjacent the ground. The conveyor chains are driven such that their upper courses move rearwardly as the apparatus is moved forwardly which causes the bales to be deposited on the ground in single file fashion with the same outer portion of the bale on which it was originally resting in the field now again in contact with the ground.

Figure 20:
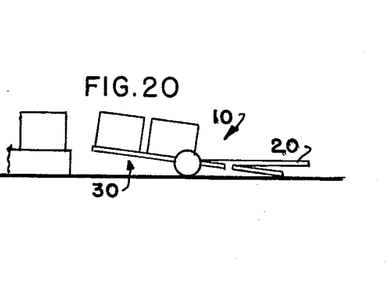

FIG. 20 illustrates the apparatus 10 during unloading of the bales onto an elevated storage area or the bed of a wagon or truck. The bed assembly 30 has been tilted to its rearwardly inclined position so as to position its rear end at the elevation of the bale receiving surface. Then the conveyor chains are driven such that their upper courses move rearwardly while the apparatus is maintained stationary which deposits the bales on the elevated surface.

It is thought that the invention and many of its attendant advantages will be understood from the foregoing description and it will be apparent that various changes may be made in the form, construction and arrangement of the parts of the apparatus described without departing from the spirit and scope of the invention or sacrificing all of its material advantages, the form hereinbefore described being merely a preferred or exemplary embodiment thereof.

Having thus described the invention, what is claimed is:

1. An apparatus for handling crop material packages, such as large round bales or the like, comprising:
   a mobile frame adapted for movement across a field;
   an elongated bed assembly mounted to said frame and capable of being disposed in an inclined position in which one of its opposite ends is disposed adjacent the field;
   first means movably mounted on said bed assembly along a first portion thereof which extends to and includes said one end thereof, said first movable means for delivering a bale or the like from the field to said one end of said bed assembly when said bed assembly is disposed in its inclined position and for moving said bale or the like along said first portion of said bed assembly;
   second means movably mounted on said bed assembly along a second portion thereof which extends from rearwardly of said first portion thereof to the other of said opposite ends thereof, said second movable means for receiving said bale or the like from said first movable means and for moving said bale or the like along said second portion of said bed assembly;
   power transmitting means for moving said first movable means;
   a member mounted generally within said bed assembly and extending upwardly with respect thereto within the path of the movement of the bale or the like along said bed assembly and being actuatable by said bale or the like as the same is moved along said first portion of said bed assembly; and
   means for operably coupling said power transmitting means to said second movable means for moving the same in response to actuation of said member by said bale or the like.

2. The apparatus as recited in claim 1, wherein:
   said first portion of said bed assembly is of a length generally equal to the length of said bale or the like; and
   said second portion of said bed assembly is of a length substantially greater than the length of said first portion thereof.

3. The apparatus as recited in claim 1, wherein said power transmitting means includes means for reversing the direction of movement of said first movable means.

4. The apparatus as recited in claim 1, wherein:
   said power transmitting means is capable of being rendered operative and inoperative and is operably coupled to said first movable means for continuously moving said first movable means whenever said power transmitting means is rendered operative; and said means for operably coupling said power transmitting means to said second movable means includes cam means normally disposed in a first position and movable to a second position in response to actuation of said member and clutch means movable between disengaged and engaged positions as said cam means is moved between its first and second position, said clutch means when moved to its engaged position couples said power transmitting means to said second movable means for moving said second movable means concurrently with said first movable means.

5. Apparatus for handling crop material packages, such as large round bales or the like, comprising:

a mobile frame adapted for movement across a field;

a bed assembly including a plurality of elongated, laterally spaced apart support members mounted to said frame and capable of being disposed in an inclined position in which the same one ends of said support members are disposed adjacent the field;

first means movably mounted on each of said support members along a first portion thereof which extends to and includes said one end of said each member, said first movable means for delivering a bale or the like from the field to said same one ends of said support members when said members are disposed in said inclined position and for moving said bale or the like along said first portions of said support members;

second means movably mounted on each of said support members along a second portion thereof which extends from said first portion thereof to the other end of said each member, said second movable means for receiving said bale or the like from said first movable means and for moving said bale or the like along said second portions of said support members;

power transmitting means for moving said first movable means;

means movably mounted generally between said support members and normally extending upwardly in a non-actuating position with respect thereto proximate adjacent ends of said first and second portions thereof and within the path of movement of the bale or the like therealong, said means being moved to an actuating position upon engagement therewith by said bale or the like as the same is moved along said first portions of said support members by said first movable means and upon arrival of said bale or the like at said adjacent ends of said first and second portions of said support members; and means for operably coupling said power transmitting means to said second movable means for moving the same in response to movement of said movably mounted means to its actuating position by said bale or the like.

6. The apparatus as recited in claim 5, wherein:

said first movable means comprises a first endless, flexible conveyor chain; and said second movable means comprises a second endless, conveyor chain.

7. The apparatus as recited in claim 5, wherein said power transmitting means includes means for reversing the direction of movement of said first movable means.

8. The apparatus as recited in claim 5, wherein:

said power transmitting means is capable of being rendered operative and inoperative and is operably coupled to said first movable means for continuously moving said first movable means whenever said power transmitting means is rendered operative; and said means for operably coupling said power transmitting means to said second movable means includes cam means normally disposed in a first position when said movably mounted means is in its non-actuating position and movable to a second position in response to movement of said movably mounted means to its actuating position and clutch means movable between disengaged and engaged positions as said cam means is moved between its first and second positions, said clutch means when moved to its engaged position couples said power transmitting means to said second movable means for moving said second movable means concurrently with said first movable means.

9. An apparatus for handling crop material packages, such as large round bales or the like, comprising:

a mobile frame adapted for movement across a field;

a bed assembly including a pair of elongated, laterally spaced apart support members mounted to said frame and capable of being disposed such that the same one ends of said support members are disposed adjacent the field;

a first endless, flexible conveying member separately movably mounted on each of said support members along a first portion thereof which extends to and includes said one end of said each member, said first conveying members for delivering a bale or the like from the field to said same one ends of said support members when said same one ends thereof are disposed adjacent the field and for moving said bale or the like along said first portions of said support members;

a second endless, flexible conveying member separately movably mounted on each of said support members along a second portion thereof which extends from said first portion thereof to the other end of said each member, said second conveying members for receiving said bale or the like from said first conveying members and for moving said bale or the like along said second portions of said support members;

first transverse shaft means mounted to said support members and coupling said first conveying members together for concurrent movement;

second transverse shaft means mounted to said support members and coupling said second conveying members together for concurrent movement;

power transmitting means operably coupled to said first transverse shaft means for moving said first conveying members;

first cam means mounted to said first transverse shaft means for pivotal movement thereabout, said first cam means being normally disposed in a non-actuating position and capable of being selectively pivotally moved to an actuating position;

second cam means mounted to said first transverse shaft means for axial movement therealong between first and second positions respectively in response to pivotal movement of said first cam means between its non-actuating and actuating positions; and clutch means normally disposed in a disengaged position so as to inoperatively couple said first transverse shaft means with at least one of said second conveying members, said clutch means being interconnected with said second cam means and movable to an engaged position in response to movement of said second cam means to its second position upon movement of said first cam means to its actuating position so as to operatively couple said first transverse shaft means with said at least one second conveying member and thereby cause movement of said second conveying members concurrently with said first conveying members.

* * * * *